United States Patent Office

3,050,453
Patented Aug. 21, 1962

3,050,453
ALKYLATION PROCESS
John Handschy and Robert J. Gordon, Walnut Creek, and Robert J. Moore, Orinda, Calif., assignors to Shell Oil Company, a corporation of Delaware
No Drawing. Filed Nov. 19, 1956, Ser. No. 622,742
2 Claims. (Cl. 204—162)

This invention relates to an improved method for carrying out the reaction of aromatic hydrocarbons with saturated aliphatic hydrocarbons to form compounds containing both an aryl and an alkyl group.

In accordance with this invention it has been found that when a liquid mixture containing a saturated aliphatic hydrocarbon and as little as one mole percent of an aromatic hydrocarbon is exposed to ionizing radiation there is a substantial production of alkyl aryl compounds and the polymerization of the aliphatic compound is substantially decreased and may be almost entirely suppressed.

The process of this invention is carried out by exposing a mixture of aliphatic saturated hydrocarbon containing at least one percent of an aromatic hydrocarbon, in condensed phase, to ionizing radiation having an energy of at least about 1,000 electron volts (ev.).

The kinds of radiation suitable for use in the present invention include electrons and photons.

Electron beams are suitably produced by electron accelerators such as the Van de Graaff and linear accelerators and by suitable arrangements of certain isotopes, e.g. strontium 90 and phosphorus 32.

High energy photons suitable for use are, for example, X-rays produced by conventional X-ray tubes and electron accelerators and gamma rays which may be produced by decay of radioactive materials such as cobalt 60, cesium 137, and fission products.

Although somewhat different effects may be observed in irradiation by heavy particles, the present invention contemplates also the use of high energy protons, alpha particles or fast neutrons.

Proton beams are produced, for example, by accelerators such as the Van de Graaff, linear accelerator, and cyclotron.

Alpha particles can be produced in the same types of accelerators as protons or can be produced by decay of radioactive materials, e.g. radium, polonium, uranium and plutonium. Fast neutrons may be obtained within a nuclear reactor or may be obtained as a beam out of a nuclear reactor or by alpha bombardment of a beryllium target. Fast neutrons act on hydrocarbons mainly by virtue of the protons accelerated by collision with the fast neutrons as they pass through the hydrocarbon mixture. The reaction may be carried out by exposing the reaction mixture in a slow neutron reactor, since there are many fast neutrons at the surface of the uranium pieces ("fuel elements") of a "slow" or "thermal" reactor.

The devices suitable for producing beams of electrons, protons, alpha particles and X-rays are well known to the art and need not be here described in detail. Methods and apparatuses for irradiating materials by means of radiation resulting from decay of radioactive substances are also well known. Sources, such as rods containing a high concentration of cobalt 60 are used in various arrangements for the radiation of materials as described, for example, in a paper by Burton, Ghormley, and Hochanadel, Nucleonics 13 (No. 10), 74 (1955), and references cited therein.

When carrying out the present reaction by means of radiation with a beam of particles, the reaction mixture may be contained in a cell constructed of a suitable material and having a window transparent to the beam. The reaction mixture may be irradiated statically or the mixture may be passed through a conduit having a window transparent to the beam so that it is irradiated in a flow system. In either case, provision is made to remove a small amount of gas, generally mainly hydrogen and/or methane, which may be formed during the irradiation. Table I illustrates suitable windows and cell construction materials to be used with various types of radiation. The whole cell or conduit within the field of radiation may be made of the transparent material.

*Table I*

| Radiation | Cell Material | Window |
|---|---|---|
| X or Gamma | ¼" Al, ⅒" S.S. (or any other metal). | None needed. |
| Fast neutrons | Aluminum, Beryllium (or metals of low capture cross section). | Do. |
| Electrons | Any | Thin aluminum foil or glass. |
| Protons | do | Do. |
| Alpha | do | Direct contact needed. |

In a special modification of the present invention the reaction mixture is exposed to radiation in a nuclear reactor. A suitable slow neutron reactor is described in substantial detail in the Fermi et al. patent, U.S. 2,708,656.

Nuclear reactors operate by fission of atoms of a fissionable isotope. These atoms, upon absorption of a neutron, fission or break up into fragments of lower mass including heavy fragments having atomic numbers approximately within the range 51 to 61 and lighter fragments having atomic numbers approximately within the range 35 to 46. In addition to the fragments, several fast neutrons having energies of several million electron volts are given off for each fission and substantial energy is released usually in the form of heat. The reactor is maintained in operation by establishment of a self-sustaining chain reaction wherein neutrons evolved from fission of one atom are made available for fission of more than one other atom and the chain reaction is permitted to increase in rate until a desired rate of reaction has been attained whereupon the reaction is controlled at a steady state at this level and the evolved heat removed by suitable coolants such as air, water, steam, liquid bismuth, etc.

Radiation generated within a reactor includes fast and slow neutron, beta, and gamma radiation. Where a neutron moderator is used in the reactor the energies of the neutrons will vary from several million electron volts to thermal energies (about 0.03 electron volt). Where little or no moderator is used, the energies of the neutrons may be largely above 100,000 electron volts. In any case, matter inserted in a neutronic reactor will be exposed to intense irradiation of neutrons having energies above 1000 to 100,000 electrons volts as well as to thermal or slow neutrons, gamma and beta radiation.

In effecting irradiation of the type herein contemplated, the feed mixtures may be introduced into the interior of a reactor as, for example, in a well designed for that purpose or through a cooling tube or tubes.

The feed mixtures to be treated may be introduced into the reactor or into the path of the fast or high energy beam in a continuous flow through a conduit, or may be placed in a receptacle in the reactor or in the path of the beam and subjected to irradiation while they are substantially static.

It is particularly contemplated to modify a reactor such as described in the above-identified Fermi et al. patent and particularly the liquid cooled reactor described by means of FIGURES 37–39 thereof by substituting for the coolant mentioned, which is water or diphenyl, a reactant mixture consisting of saturated aliphatic hydrocarbons and at least one percent of an aromatic. Particularly suitable in this case are mixtures containing at least about 20% of an aromatic hydrocarbon. Aromatics having at least 2 rings are preferably used, in admixture with saturated aliphatic hydrocarbons having at least 10 carbon atoms per molecule. In the operation of neutronic reactors using diphenyl as coolant, a slow decomposition of the coolant is observed leading to gas formation and the production of viscous material. In accordance with this invention the reaction mixture is substituted for diphenyl; reaction product is continually removed and replaced by fresh reactants. Thus, the production of very high molecular weight material due to repeated exposure of product heavier than the feed is avoided, and instead of waste of diphenyl there is a production of useful materials.

In the process of this invention it is essential that the reactants be irradiated in condensed phase i.e. as a liquid or a solid mixture.

The temperature at which the reaction is carried out does not significantly affect the reaction. Thus, the reaction may be carried out at atmospheric temperature, at lower temperatures down to −20° C. or less and at higher temperatures up to 450° C. or more provided the reactants are maintained in condensed phase. The pressure also does not significantly affect the results, so long as the reactants are under sufficient pressure to be maintained in condensed phase.

The time of exposure of the reactants to radiation is a function of the intensity of radiation employed, the geometry of the reaction zone, and the desired degree of conversion. Since there is a tendency for reaction products to be further converted it is desired to discontinue reaction when conversion is within the range of one to 30% and preferably between 15 to 20%, based on the reactant present in less than stoichiometric concentration for monoalkylation.

When the radiation employed consists of high energy electrons or photons there is no danger of producing a substantially radioactive product. When heavy particles are used, and particularly when the reaction mixture is exposed in a neutronic reactor, it will not be made appreciably radioactive if the mixture consists entirely of hydrocarbons. Some $H^3$ and $C^{14}$ will probably be produced, but only in very small amounts. However, very small amounts of impurities such as most metals and certain non-metals e.g. sulfur, phosphorus and chlorine, will be made radioactive in a neutronic reactor. It is, therefore, desirable to purify the hydrocarbon feed so that it contains little or none of these impurities. This is also important because certain more commonly occurring impurities e.g. boron, vanadium, titanium, iron and calcium have a great tendency to capture thermal neutrons and would thus substantially interfere with or entirely inhibit the operation of a neutronic reactor. Other relatively less frequently found impurities, e.g. cadmium, samarium, gadolinium, hafnium, cobalt and some others have extremely high cross sections for absorption for thermal neutrons and are, therefore, very objectionable.

It will therefore be desirable to purify the hydrocarbon feed rather carefully, e.g. by distillation and/or treatment with adsorbents such as porous silica gel and/or acid treatment or other methods known to reduce impurities.

Although there has been speculation on the nature of chemical reactions taking place when various hydrocarbons are exposed to high energy radiation, it is not fully known by what mechanisms such reactions proceed and the present invention is not based on any theory of reaction mechanisms.

It has been found, in accordance with this invention that when a mixture of monocyclic hydrocarbons and a paraffin is exposed to ionizing radiation the production of the alkyl-aryl compound in a mixture having 20 mole percent of the aromatic is more than that which would be expected based on a statistical calculation. The observed maximum yield of the alkyl-aryl compound with any concentration of aromatic is about 140% of the expected maximum based on statistical calculations. Conversely, the yield of the dimer of the aliphatic compound is reduced to less than one-half of that expected in a mixture containing 20% of monocyclic aromatic. For mixtures of monocyclic aromatic and saturated relatively unbranched aliphatics, a yield in excess of the maximum expected yield is obtained from mixtures having between 10 and 70 mole percent of the aromatic; the highest yields are obtained from mixtures having between 20 and 50 mole percent of the aromatic.

It has been further observed that polycyclic aromatics are particularly effective in preventing the formation of polymerization product of saturated compounds. Thus, as little as one mole percent of alkyl naphthalene substantially prevented the formation of heavier condensation product of a slightly branched paraffin having an average molecular weight of about 400, when irradiated under conditions in which substantially all of the aromatic was further alkylated. Similarly, a mixture having 20 mole percent of alkyl naphthalene and 80 mole percent of slightly branched paraffin when irradiated by gamma radiation to the extent of $5 \times 10^8$ roentgens, showed substantially no polymerization of the paraffin and substantially complete alkylation of the aromatic to products having at least one additional alkyl group. Thus, with polycyclic aromatics, the observed maximum yield of alkyl aryl compound is as much as 1000% of that expected on the basis of statistical calculation and the yield of dimer of the aliphatic compound can be reduced essentially to zero.

Saturated aliphatic hydrocarbons suitable for use in the process of this invention are compounds having at least 3 carbon atoms per molecule and preferably compounds which are normally liquid.

The aromatic hydrocarbon employed may be a monocyclic such as benzene or an alkyl benzene, including toluene and the various polymethyl benzenes, up to pentamethyl benzene. It is necessary that the aromatic nucleus have at least one and preferably more than one open position, Alkyl substituents having two, three or more carbon atoms may be present in the aromatic feed.

Polycyclic aromatics suitable for use are naphthalene, anthracene, phenanthrene, acenaphthene diphenyl, terphenyl and other unsubstituted polycyclics or their alkyl substituted derivatives.

We claim as our invention:

1. A process for producing alkyl aromatic hydrocarbons which comprises exposing a liquid mixture containing at least one mole percent of an alkyl naphthalene and a saturated aliphatic hydrocarbon having at least 10 carbon atoms per molecule to a gamma radiation dosage of $5 \times 10^8$ roentgens, said radiation having an energy of at least about 1,000 electron volts.

2. A process according to claim 1, wherein the alkyl substituents of the alkyl naphthalene have 1–3 carbon atoms each and the aliphatic hydrocarbon is a slightly branched paraffin having an average molecular weight of about 400.

References Cited in the file of this patent
UNITED STATES PATENTS

| | | |
|---|---|---|
| 2,743,223 | McClinton | Apr. 24, 1956 |
| 2,904,483 | Long | Sept. 15, 1959 |

FOREIGN PATENTS

| | | |
|---|---|---|
| 697,601 | Great Britain | Sept. 23, 1953 |
| 708,901 | Great Britain | May 12, 1954 |